US011170297B2

(12) United States Patent
Chiueh et al.

(10) Patent No.: US 11,170,297 B2
(45) Date of Patent: Nov. 9, 2021

(54) METHOD OF NEURAL NETWORK TRAINING USING FLOATING-POINT SIGNED DIGIT REPRESENTATION

(71) Applicant: National Taiwan University, Taipei (TW)

(72) Inventors: Tzi-Dar Chiueh, Taipei (TW); Po-Chen Lin, Hsinchu (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 794 days.

(21) Appl. No.: 16/000,857

(22) Filed: Jun. 5, 2018

(65) Prior Publication Data
US 2019/0303756 A1 Oct. 3, 2019

(30) Foreign Application Priority Data

Mar. 30, 2018 (TW) .................................. 107111198

(51) Int. Cl.
*G06N 3/08* (2006.01)
*G06N 5/04* (2006.01)
*G06N 20/00* (2019.01)
*G06F 7/483* (2006.01)

(52) U.S. Cl.
CPC ............. *G06N 3/08* (2013.01); *G06F 7/4833* (2013.01); *G06N 5/04* (2013.01); *G06N 20/00* (2019.01)

(58) Field of Classification Search
CPC ............ G06N 3/08; G06N 20/00; G06N 5/04; G06N 3/02; G06N 20/10; G06N 20/20; G06N 5/00; G06F 7/4833; G06F 7/483
See application file for complete search history.

(56) References Cited

U.S. PATENT DOCUMENTS 10,713,558 B2 * 7/2020 Sumbul ..................... G06N 3/04

FOREIGN PATENT DOCUMENTS

GB 2537419 A * 10/2016 ............. G06F 7/485

OTHER PUBLICATIONS

Chen et al. , "Grouped Signed Power-of-Two Algorithms for Low-Complexity Adaptive Equalization", Dec. 12, 2005, https://ieeexplore.ieee.org/abstract/document/1556798 (Year: 2005).*
Sze et al. "Efficient Processing of Deep Neural Networks: A Tutorial and Survey", Nov. 20, 2017, https://ieeexplore.ieee.org/abstract/document/8114708 (Year: 2017).*

(Continued)

*Primary Examiner* — Kamran Afshar
*Assistant Examiner* — Shoun J Abraham
(74) *Attorney, Agent, or Firm* — Muncy, Geissler, Olds & Lowe, P.C.

(57) ABSTRACT

A method of training a neural network including multiple neural network weights and multiple neurons, and the method includes using floating-point signed digit numbers to represent each of the multiple neural network weights, wherein a mantissa of each of the multiple neural network weights is represented by multiple mantissa signed digit groups and an exponent of each of the multiple neural network weights is represented by an exponent digit group; and using the exponent digit group and at least one of the multiple mantissa signed digit groups to perform weight adjustment computation and neural network inference computation.

4 Claims, 6 Drawing Sheets

(56) References Cited

OTHER PUBLICATIONS

Lai et al. "Deep Convolutional Neural Network Inference with Floating-point Weights and Fixed-point Activations", Mar. 8, 2017 https://arxiv.org/pdf/1703.03073.pdf (Year: 2017).*

Hemmert et al. "Fast, Efficient Floating-Point Adders and Multipliers for FPGAs", Sep. 2010 https://dl.acm.org/doi/10.1145/1839480.1839481 (Year: 2010).*

Koster et al. "Flexpoint: An Adaptive Numerical Format for Efficient Training of Deep Neural Networks", Dec. 5, 2017 https://arxiv.org/abs/1711.02213 (Year: 2017).*

Lin et al. "Neural Networks With Few Multiplications", Feb. 26, 2016 https://arxiv.org/pdf/1510.03009.pdf (Year: 2016).*

* cited by examiner

METHOD OF NEURAL NETWORK TRAINING USING FLOATING-POINT SIGNED DIGIT REPRESENTATION

BACKGROUND OF THE INVENTION

1. Field of the Invention

The present invention relates to a method of neural network training, and more particularly, to a method of neural network training using floating-point signed digit representation to simplify computation complexity for network training.

2. Description of the Prior Art

Deep Neural Networks (DNN), also known as deep learning, have advanced so much in the past few years to allow artificial intelligence (AI) to realize applications such as object detection, image recognition, voice recognition, medical diagnosis, self-driving vehicles, and so on.

Network inference refers to feeding input data to a neural network model, going through a series of computations, and finally obtaining inference results corresponding to the neural network model. Before a suitable neural network model is obtained, it is required to perform neural network training to establish proper neural network weights that allow the neural network model to generate proper inference results according to the input data and the network weights for realizing the above-mentioned applications.

The neural network training procedure includes setup, forward pass computation, backward pass computation, and weight update. A neural network model may include an input layer, multiple hidden layers, and an output layer. Take a neural network including one hidden layer as an example. Firstly, configure the neural network with initial weight values in the setup stage; compute output values of this layer according to given input values, so as to perform forward pass computation; compute error values and weight adjustment values of this layer according to the given input values, the output values and the weight values, to perform backward pass computation; and finally adjust the weights according to the weight adjustment values, to perform weight update. By iteratively performing computations abovementioned to adjust the weights until the proper weights for the neural network are obtained, the neural network model may generate proper inference results according to the input data and the weights. In general, when performing neural network training, the weights are adjusted by accumulated adjustment values that are generated after multiple sets of input data have passed through all the layers of the neural network.

As can be seen, when the size of the neural network model becomes larger (in particular the deep neural networks), the computation complexity and memory access for performing neural network training becomes enormous. Currently, in actual applications, 32-bit standard floating-point numbers are commonly used to represent neural network weights when performing neural network training computation, wherein the hardware power consumption and computation complexity for handling standard floating-point numbers are both quite high.

Therefore, how to simplify computation complexity for neural network training to reduce hardware power consumption and computation complexity has become quite essential in deep learning technology development.

SUMMARY OF THE INVENTION

Therefore, an objective of the present invention is to provide a method of neural network training using floating-point signed digit representation to simplify computation complexity for network training.

The present invention discloses a method of neural network training for a neural network. The method includes using a floating-point signed digit (hereinafter abbreviated as FloatSD) number to represent a neural network weight of the neural network, wherein a mantissa of the neural network weight is represented by multiple mantissa signed digit groups and an exponent of the neural network weight is represented by an exponent digit group, and using the exponent digit group and at least one of the multiple mantissa signed digit groups of the neural network weight to perform weight adjustment computation and neural network inference computation.

The present invention further discloses a method of adjusting neural network weights during training of a neural network. The method includes using an exponent digit group and at least one of multiple mantissa signed digit groups of each neural network weight of the neural network to compute a weight adjustment value of a neural network weight; and adjusting a neural network weight before adjustment according to the weight adjustment value to generate a neural network weight after adjustment; wherein the neural network weight is represented by a FloatSD number, and the mantissa of the FloatSD neural network weight is represented by the multiple mantissa signed digit groups, and the exponent of the neural network weight is represented by the exponent digit group.

To simplify neural network training and inference computation, the present invention uses floating-point signed digit (FloatSD) numbers to represent neural network weights, and uses neural network weights and neuron output values to compute weight adjustment values during neural network training and perform neural network inference computation. As a result, the present invention can reduce the number of non-zero digits comprised in the neural network weights, which allows shift-and-add circuits to replace floating-point multipliers in performing multiplications involving the neural network weights, which reduces the computation complexity for network training (for example, forward pass computation and backward pass computation). In addition, since neural networks have the characteristics of error tolerance, the present invention may use only two mantissa signed digit groups along with the exponent group when performing neural network inference computation, forward pass computation, and backward pass computation. As a result, the number of non-zero digits in a neural network weight is significantly reduced and the computation complexity for multiplications between the neuron outputs and the neural network weights can be simplified, thus reducing the computation complexity, memory access, as well as hardware power consumption for neural network training and inference.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
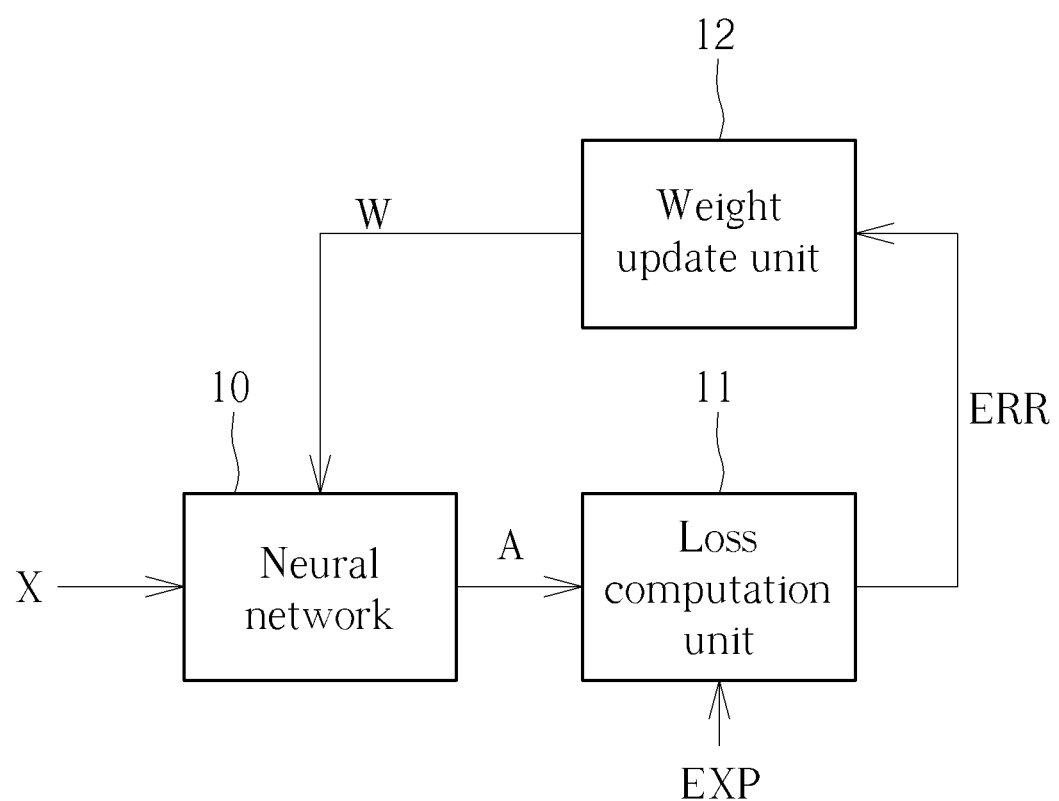
FIG. 1 illustrates operations of a neural network performing neural network training according to an embodiment of the present invention.

FIG. 1 illustrates operations of a neural network 10 performing neural network training according to an embodiment of the present invention. The neural network 10 may generate a set of output data A according to a set of input data X and a set of corresponding weights W, then compute a loss value ERR between the output data A and an expectation EXP by a loss computation unit 11, and finally adjust the weight W according to the loss value ERR by a weight update unit 12. The neural network 10 includes an input layer (for example, the input data X), at least one hidden layer and an output layer (for example, the output data A), wherein each layer may include multiple neurons (also known as nodes), upper layer neuron(s) and lower layer neuron(s) may be connected by a connection transmitting data via a weight value.

Figure 2:
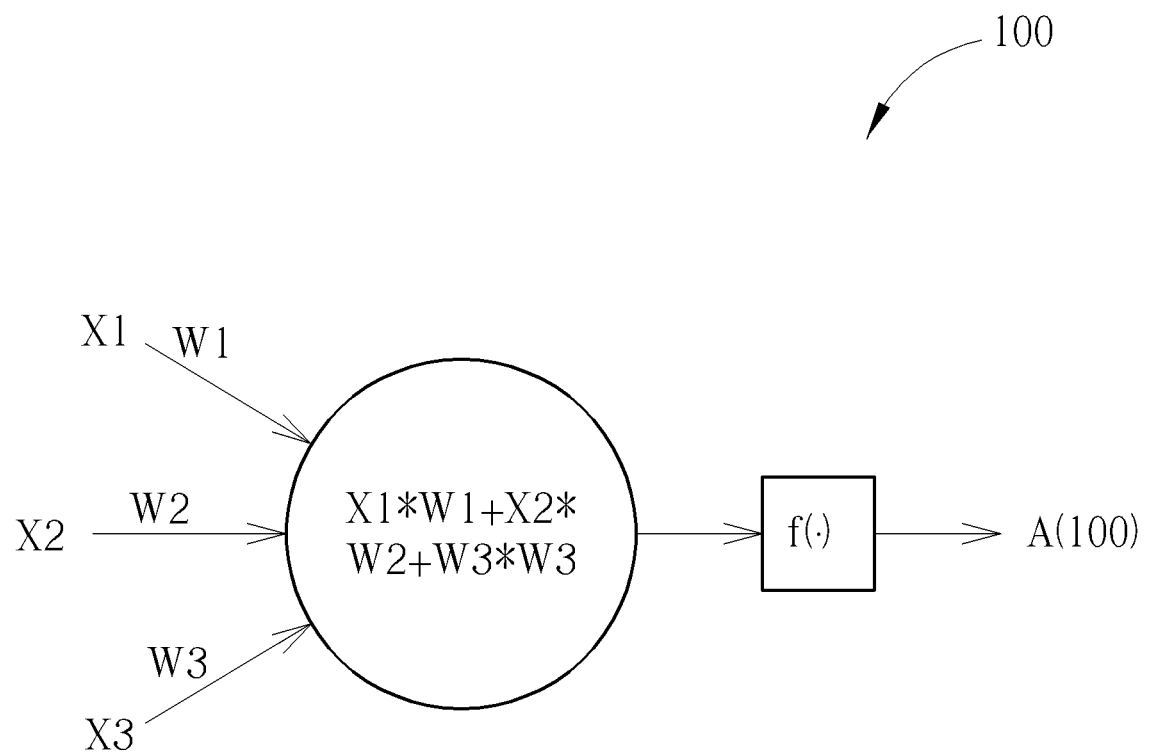
FIG. 2 is a schematic diagram of computations of a neuron of the neural network in FIG. 1 according to an embodiment of the present invention.

FIG. 2 is a schematic diagram of computations of a neuron 100 of the neural network 10 according to an embodiment of the present invention. Given that there are three upper layer neurons connected to the neuron 100 and configured to respectively output neuron values X1-X3 to the neuron 100. The neuron 100 may perform a convolutional computation according to the neuron values X1-X3 and the network weights W1-W3, and then pass through a non-linear function f(.), which is also known as activation function, to obtain a neuron output value A, also known as neuron activation value.

The neural network training for the convolutional neural network and multilayer perceptron involves many variables and formulas, so the required computation and memory access are quite massive. In one embodiment, in order to simplify the computation complexity for neural network training, the weight update unit 12 may use floating-point signed digit group representation (hereinafter abbreviated as FloatSD) to represent an approximated value of the weight. Floating-point signed digit group representation refers to dividing a mantissa into multiple mantissa groups, wherein each group includes at most one non-zero digit. For example, when the signed digit group representation is applied in binary representation, a group with four digits may include one non-zero digit and three zero digits or four zero digits, and there are 9 possible values representable by a group with four digits as shown in Table 1.

TABLE 1

Four-digit signed digit group representation

| | |
|---|---|
| Positive number | 1000(8) |
| | 0100(4) |
| | 0010(2) |
| | 0001(1) |
| Zero | 0000(0) |
| Negative number | 0001(−1) |
| | 0010(−2) |
| | 0100(−4) |
| | 1000(−8) |

Note that "1" represents the digit "−1".

Take a multiplier 63 (decimal representation) for example. It may be converted into "0111111" using the binary representation, and "1000 0001" using the signed digit group representation (i.e., 64-1). Under the signed digit group representation, any multiplicand multiplying with multiplier 63 can be performed by shifting the multiplicand left by six digits and then subtracting by the multiplicand. Therefore, for hardware design, there is only one adder needed to perform the addition of the negative multiplicand (i.e., subtraction of the multiplicand). In the example of FIG. 2, given that the weight W1 is represented by "1000 0001" using the signed digit group representation, the neuron 100 shifts the input neuron X1 data left by six bits and then subtracts it by the neuron data X1 to perform the multiplication of X1 by W1 (X1-W1). As a result, using signed digit group numbers to represent the approximation of network weights may significantly simplify the computation complexity of neural network training.

Under the signed digit group representation, the value of a group is adjusted according to Table 1, wherein the value of the group is increased or decreased by moving to the greater or smaller value immediately above or below the current value in the table provided that such move will not go beyond the boundary of the table. For example, given that a group currently represents a negative value 0001(−1), then the group will be set to 0000(0) after increment; given that the group has a positive value 0010(2), then the group will be set to 0100(4) after increment. On the other hand, given that the group has a negative value 0001(−1), then the group will set to 0010(−2) after decrement; given that the group has a positive value 0010(2), then the group will set to 0001(1) after decrement.

When the value of the group is already at the topmost position (1000) and it is requested to increment, then a carry (increment) signal is generated to its neighbor group to the left (closer to the most significant group (MSG)) and the current group value is set to the smallest value (1000). Take computing "40+8" in the decimal representation as an example. The summation may be converted into "0010 1000+0000 1000" with the signed digit group representation. The outcome will be approximated by "0100 1000", where the group on the right has been adjusted from the greatest value (1000) to the smallest value (1000) and the group on the left has been incremented by one position to (0100) after receiving the carry signal from its neighbor on the right. The exact result 48 using the decimal representation is approximated by "64−8=56" when using the signed digit group representation.

When the value of the group is already at the bottommost position (1000) and it is requested to decrement, then a borrow (decrement) signal is generated to its neighbor group to the left and the current group value is set to the greatest value (1000). Take computing "24-8" in the decimal representation as an example. The subtraction may be converted into "0010 1000+0000 1000" with the signed digit group representation, and the outcome is approximated by "0001 1000". The exact value 16 with the decimal representation is approximated by "16+8=24" with the signed digit group representation.

Due to the well-known high tolerance of errors in the neural networks, many research results have reported that using approximated neural network weights in the forward and backward computation of neural network training can obtain accuracy results very close to that of training using exact neural network weights. For example, using a limited number of more significant bits in the mantissa of the 32-digit standard floating-point number for neural network weights and setting the remaining bits of the mantissa to zero when performing neural network training, training results close to that of using the exact floating-point numbers for the weights can be obtained. In addition, it is found that using all the bits of the mantissa of the neural network weights to perform weight update during the training makes the inference result of the trained network converge, which ensures that the output data A generated by the neural network 10 converges to the expectation EXP. For the example in FIG. 2, instead of standard 32-bit floating point representation for neural network weights, one can use only 8 bits for exponent and 6 bits for mantissa to represent the neural network weight W1, wherein the mantissa is represented by two signed digit groups with 3 digits in each group. In this representation, only two shift and add operations are required to perform forward and backward pass computations that involve multiplication with neural network weights. This is because for multiplication of a weight with another value, each signed digit group in the mantissa requires one shift and add operation, which reduces memory access and computation complexity. However, it is noted that 32-bit number representation for the weight W1 is still necessary when performing neural network weight update for the output data A generated by the neuron 100 to converge to the expectation EXP.

In one embodiment, the neural network weight W is further represented by a neural network weight before adjustment $W_{BEFORE}$ and a neural network weight after adjustment $W_{AFTER}$. The weight update 12 adaptively adjusts the neural network weight before adjustment $W_{BEFORE}$ according to the weight adjustment value to generate the neural network weight after adjustment $W_{AFTER}$.

In one embodiment, the neural network weight before adjustment $W_{BEFORE}$, weight adjustment value, and neural network weight after adjustment $W_{AFTER}$ are represented by standard floating-point numbers. When performing weight update, the weight update unit 12 may add the weight adjustment value (which may have positive or negative value) to the neural network weight before adjustment $W_{BEFORE}$ to generate neural network weight after adjustment $W_{AFTER}$. When the neural network 10 performs forward or backward pass computation to generate the next weight adjustment value or performs the neural network inference computation, the weight update unit 12 may convert the mantissa of the neural network weight after adjustment $W_{AFTER}$ from the standard floating-point number to the floating-point signed digit (FloatSD) number and then transmit it to the neural network 10. When the neural network weight before adjustment $W_{BEFORE}$, the weight adjustment value, and the neural network weight after adjustment $W_{AFTER}$ are all represented by the standard floating-point numbers, the weight update in training will be equivalent to using the exact value of the mantissa for the neural network weights, thus ensuring the precision of weight update and neural network training results.

Figure 3:
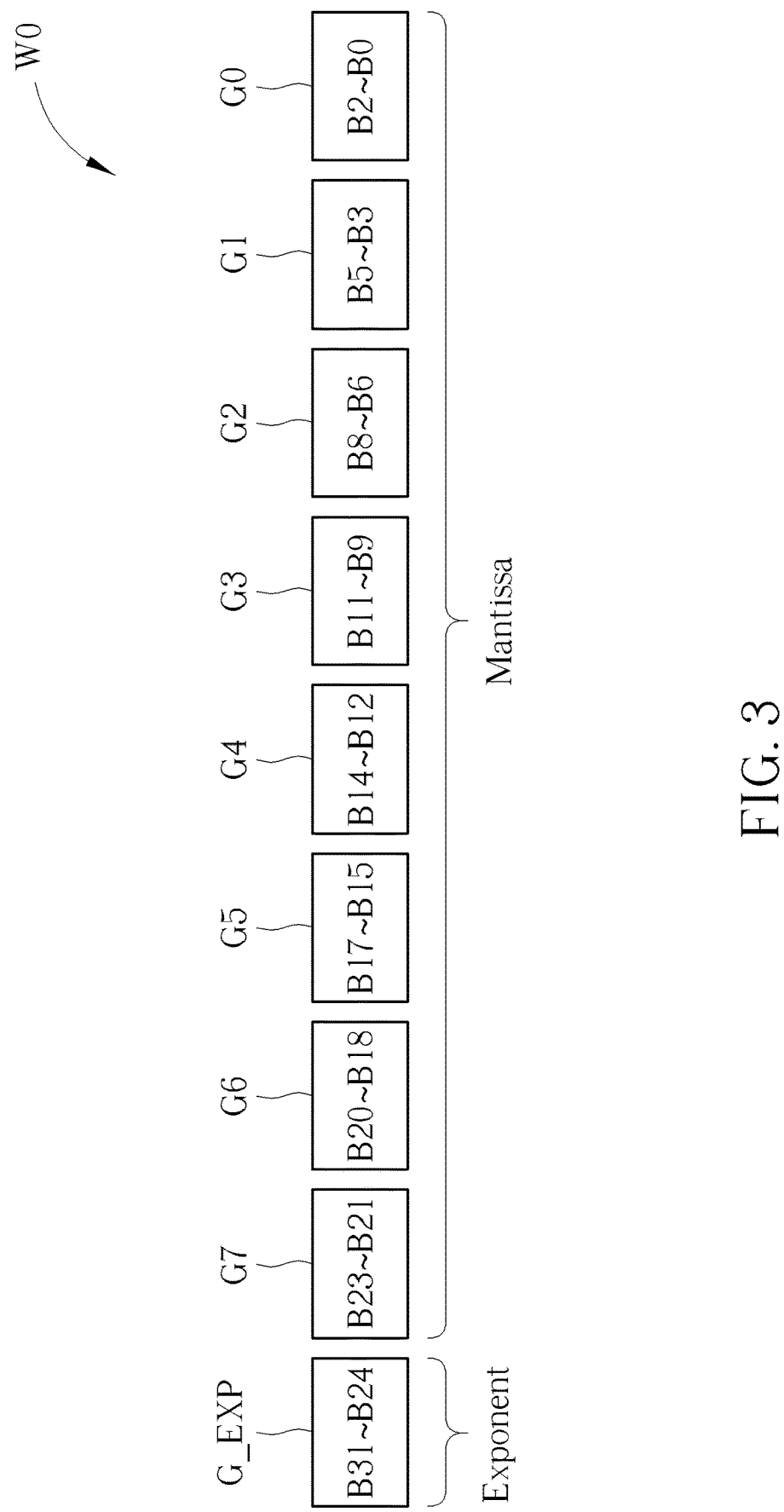
FIG. 3 is a schematic diagram of a neural network weight using floating-point signed digit representation according to an embodiment of the present invention.

In one embodiment, the weight adjustment value is represented by a standard floating-point number, while the neural network weight before adjustment $W_{BEFORE}$ and the neural network weight after adjustment $W_{AFTER}$ are represented by floating-point signed digit (FloatSD) numbers. FIG. 3 is a schematic diagram of a weight W0 using floating-point signed digit representation according to an embodiment of the present invention, wherein weight W0 is represented by a floating-point signed digit (FloatSD) number, and includes 8 bits representing an exponent of the FloatSD number and 24 digits representing a mantissa of the FloatSD number.

In this embodiment, the weight W0 includes an exponent group G_EXP and multiple mantissa groups G0-G7. The exponent group G_EXP has a width of 8 bits including bits B31-B24, wherein bit B31 is the most significant bit, the bit B24 is the least significant bit. The mantissa groups G7-G0 are represented by signed digit groups, wherein each group includes 3 digits, and respectively indicated by B23-B21, B20-B18, B17-B15, B14-B12, B11-B9, B8-B6, B5-B3 and B2-B0. Each of the groups includes at most one non-zero digit. The mantissa group G7 is the most significant group (MSG), while the mantissa group G0 is the least significant group (LSG).

Under the signed digit group representation, each of the mantissa groups G7-G0 may represent 7 numbers, as shown in Table 2.

TABLE 2

| Three-digit signed digit group representation | |
| --- | --- |
| Positive | 100(4) |
| number | 010(2) |
|  | 001(1) |
| Zero | 000(0) |
| Negative | 001(−1) |
| number | 010(−2) |
|  | 100(−4) |

Note that "1" represents the digit "−1".

Since each of the mantissa groups G7-G0 includes at most one non-zero digit, the number of required shift and add circuits in a multiplier for FloatSD weight equals to the number of the mantissa groups used in the multiplication. For example, when performing neural network training, two shift and add circuits are required when only the two most significant mantissa groups are used in the computation of weight adjustment value. Comparing with the 24 shift and add circuits in the multiplier circuit for 24-bit mantissa of the standard floating-point representation in the prior art, the present invention, leveraging the FloatSD representation for the neural network weights uses much fewer shift and add circuits to perform multiplication in neural network training, significantly reducing computation and hardware complexity required for neural network training.

In this embodiment, the adjustment of weight W0 starts with adjustment of the mantissa groups G7-G0, followed by the adjustment of the exponent group G_EXP, wherein the mantissa groups G7-G0 are adjusted from a suitable mantissa group toward the most significant group (G7). The weight update unit 12 may determine at least one suitable mantissa group to start weight adjustment according to the absolute value of the weight adjustment value, and determine a direction of adjustment (i.e., increment or decrement) of the non-zero digits in the suitable mantissa group according to the weight adjustment value. For each suitable mantissa group, the weight update unit 12 may generate at least a carry (increment) signal or a borrow (decrement) signal for this group to adjust its value. Subsequently, after the current mantissa group has been adjusted and if the current mantissa group generates a carry or borrow signal to its left neighbor group, the weight update unit 12 moves to that next mantissa group, which is closer to G7 and then adjusts that group according to the carry or borrow signal received, and so on. When there is a carry or borrow signal generated by the most significant group G7 during its adjustment, the weight update unit 12 should adjust the exponent group G_EXP.

In one embodiment, the weight adjustment value indicates at least one suitable mantissa group in a FloatSD weight, and each of the suitable group corresponds to at least one carry signal or at least one borrow signal. When there are multiple suitable mantissa groups, each of the suitable mantissa groups is adjusted by a same methodology. For example, after the mantissa group G3 has been adjusted, the weight update unit 12 may set the mantissa group G4 as the current adjustment group. Given that when adjusting the mantissa group G3, there is a carry signal or a borrow signal generated to the mantissa group G4, the weight update unit 12 may make G4 the current adjustment group and increase (or decrease) the mantissa group G4 according to the received carry signal (or borrow signal) by G4, and accordingly may generate a new carry signal (or borrow signal) to the mantissa group G5. When the current adjustment group G4 has reached the upper limit (e.g., "100") and still needs increment, the weight update unit 12 may generate a new carry signal to G5; when the current adjustment group G4 has reached a lower limit (e.g., "100") and still needs decrement, the weight update unit 12 may generate a borrow signal to G5. Likewise, the weight update unit 12 may iteratively perform adjustment until the most significant group (i.e., the mantissa group G7) has been adjusted, and then adjust the exponent group G_EXP.

In one embodiment, when the most significant group (MSG) has reached an upper limit (e.g., the mantissa group G7 is "100(4)"), or the most significant group has reached a lower limit (e.g., the mantissa group G7 is "100 (−4)"), the weight update unit 12 may add the exponent group G_EXP by 1 and right shift the mantissa groups (G7-G0) by 1 digit. For example, if a group is 100(4), 010(2), 000(0), 100 (−4) or 010 (−2), the group becomes 010(2), 001(1), 000(0), 010 (−2) or 001 (−1) after it is right shifted by 1 digit; if a group is 001(1) or 001 (−1), the group becomes 000(0) after it is right shifted by 1 digit. In another embodiment, the weight update unit 12 may increase the exponent group G_EXP (by the number of group digits), right shift the mantissa groups G7-G1 by the number of digits in a group to take places of the mantissa groups G6-G0, and set the mantissa group G7 to 000(0).

In one embodiment, when the most significant group is zero (e.g., the mantissa group G7 is "000"), the weight update unit 12 may decrease the exponent group G_EXP by the number of group digits (e.g., decrease the exponent group G_EXP by 3, which is the number of digits in one mantissa group); left shift the mantissa groups G6-G0 to take place of the mantissa groups G7-G1, and set the mantissa group G0 (LSG) to 000(0). As a result, the mantissa groups with non-zero values are shifted to the left so as to enhance the precision of the mantissa, as shown in Table 3.

TABLE 3

| | |
|---|---|
| before adjustment | G_EXP "0000 0101"; G7-G0 "000 001 100 000 000 000 000 001" |
| after adjustment | G_EXP "0000 0010"; G7-G0 "001 100 000 000 000 000 001 000" |

According to Table 3, the decimal point of the neural network weight is shifted toward right by 3 digits (i.e., the number of digits comprised in one mantissa group), which is equivalent to multiplying the neural network weight by $2^3$ or 8 times, and thus the exponent group G_EXP shall be subtract by 3, which is equivalent to multiplying the neural network weight by $2^{-3}$ or ⅛ times, to keep the neural network weight consistent.

In one embodiment, the exponent of the network weight is represented by a multiplication of the exponent group G_EXP and a constant, as shown in formula (3.1):

$$\text{EXP} = G\_EXP \cdot B \quad (3.1),$$

wherein EXP is an exponent value, B is a constant, and the constant B equals 1 or the number of digits comprised in one mantissa group. In the example of Table 1, the constant B equals 4; in the example of Table 2, the constant B equals 3; in the example of Table 3, the constant B equals 1.

In one embodiment, given that the constant B equals 3, when the most significant group equals zero (e.g., the mantissa group G7 is "000"), the weight update unit 12 decreases the exponent group G_EXP by 1 and the exponent value is decreased by the constant B correspondingly, as shown in Table 4.

TABLE 4

| | |
|---|---|
| Before adjustment | G_EXP "0000 0101"; G7-G0 "000 001 100 000 000 000 000 001" |
| After adjustment | G_EXP "0000 0100"; G7-G0 "001 100 000 000 000 000 001 000" |

According to Table 4, the decimal point of the neural network weight is shifted toward left by 3 digits, since the exponent of the neural network weight is represented by a multiple of the constant B=3, the exponent group G_EXP should be subtract by 1 to keep the neural network weight consistent. In other words, decreasing or increasing the exponent group G_EXP by 1 is equivalently to subtracting constant B from or adding constant B to the exponent value of the neural network weight.

Figure 4:
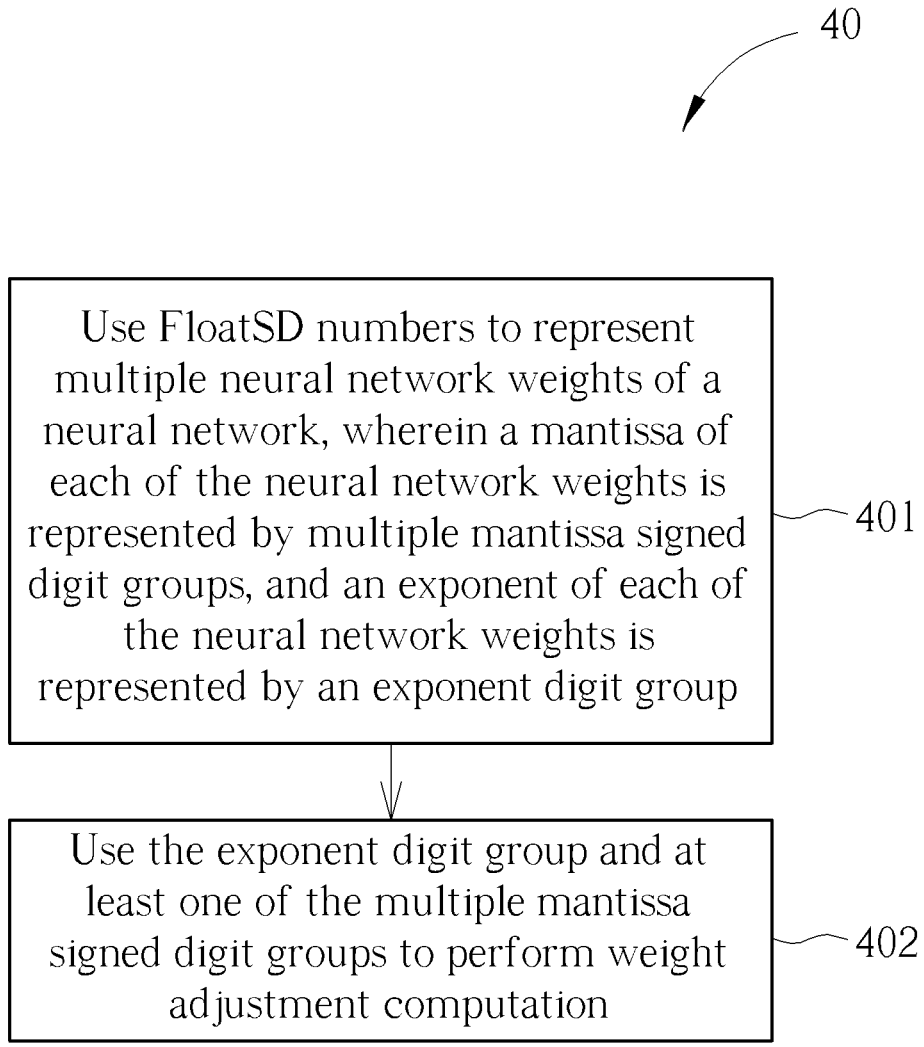
FIG. 4 is a flowchart of a neural network training process according to an embodiment of the present invention.

Operations regarding the neural network 10 may be summarized into a neural network training process 40 as shown in FIG. 4. The neural network training process 40 may be compiled into a program code and store in a memory device, and configured to instruct the neural network 10 to perform the following steps.

Step 401: Use FloatSD numbers to represent multiple neural network weights of a neural network, wherein a mantissa of each of the neural network weights is represented by multiple mantissa signed digit groups, and an exponent of each of the neural network weights is represented by an exponent digit group.

Step 402: Use the exponent digit group and at least one of the multiple mantissa signed digit groups to perform weight adjustment computation.

In the neural network training process 40, the neural network 10 may use the multiple mantissa signed digit groups G7-G0 to represent the mantissa of the weight W0, and use the exponent digit group G_EXP to represent the exponent of the weight W0 (Step 401); then, the neural network 10 may use the exponent digit group G_EXP and at least one of the multiple mantissa signed digit groups in G7-G0 to perform computation of the weight adjustment value (Step 402).

In one embodiment, the neural network 10 may use the most significant group G7 and the second significant group G6 of the mantissa groups, wherein a width of the mantissa group is 3-digit, to perform forward pass computation and backward pass computation of neural network training. The complexity of multiplication between the neuron activation and the neural network weight depends on the number of non-zero digits in the neural network weight. Since the neural network 10 has reduced the non-zero mantissa digits of the neural network weight, the computation complexity of multiplications between the neuron activation and the neural network weight during the forward pass computation and backward pass computation for neural network training can be reduced, so as to simplify the computation complexity and reduce memory access in neural network training. For example, the mantissa may be represented by 2 groups, each with 3 digits (on the total 6 digits), with only 2 non-zero digits, and thus only 2 shift and add circuits are required to perform the multiplication.

Figure 5:
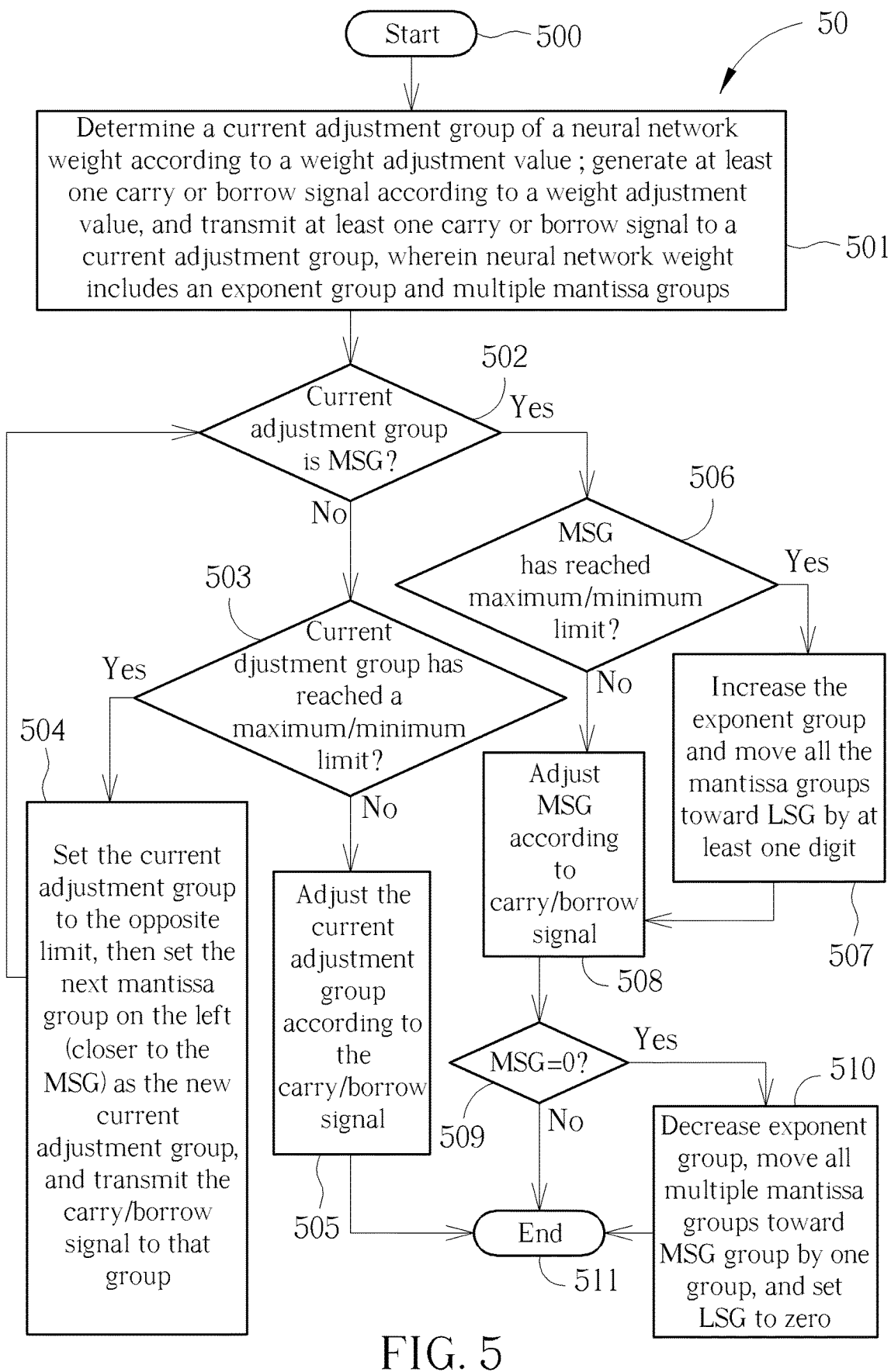
FIG. 5 is a flowchart of a weight adjustment process according to an embodiment of the present invention.

Operations regarding the weight update unit 12 to perform neural network weight adjustment may be summarized into a weight adjustment process 50 as shown in FIG. 5. The weight adjustment process 50 may be compiled into a program code and stored in a memory device, and configured to instruct the weight update unit 12 to perform the following steps.

Step 500: Start.

Step 501: Determine a current adjustment mantissa group of a neural network weight according to a weight adjustment value; generate at least one carry signal or at least one borrow signal according to the weight adjustment value, and transmit the at least one carry signal or the at least one borrow signal to the current adjustment mantissa group; wherein the neural network weight includes an exponent group and multiple mantissa groups.

Step 502: Determine whether the current adjustment group is a most significant group of the multiple mantissa groups? Perform Step 503 if no; perform Step 506 if yes.

Step 503: Determine whether the current adjustment group before adjustment has reached a maximum limit or a minimum limit and cannot be adjusted according to the carry signal or borrow signal? Perform Step 504 if yes; perform Step 505 if no.

Step 504: Set the current adjustment group to the opposite limit, then set the next mantissa group on the left (closer to the most significant group) as the new current adjustment group, and transmit the carry signal or the borrow signal to that group. Return to Step 502.

Step 505: Adjust the current adjustment group according to the carry signal or the borrow signal. Perform Step 511.

Step 506: Determine whether before adjustment the most significant group has reached a maximum limit or a minimum limit and cannot be adjusted according to the carry signal or the borrow signal? Perform Step 507 if yes; perform Step 508 if no.

Step 507: Increase the exponent group and move all the mantissa groups toward the least significant group by at least one digit. Perform Step 508.

Step 508: Adjust the most significant group according to the carry signal or the borrow signal.

Step 509: Determine whether after adjustment the most significant group is zero? Perform Step 510 if it is zero; perform Step 511 if it is not zero.

Step 510: Decrease the exponent group, move all the multiple mantissa groups toward the most significant group by one group, and set the least significant group to zero.

Step 511: End.

In the weight adjustment process 50, in Step 501, the weight update unit 12 may determine a current adjustment group of the neural network weight W0 according to weight adjustment value; generate the carry signal or the borrow signal according to weight adjustment value; and transmit the carry signal or the borrow signal to the current adjustment group, wherein the neural network weight W0 includes one exponent group G_EXP and multiple mantissa groups G7-G0.

In Step 502-503, when the weight update unit 12 determines that the current adjustment group is not the most significant group G7 of the mantissa groups, the weight update unit 12 determines whether before adjustment the current adjustment group has reached a maximum limit or a minimum limit and cannot be adjusted according to the carry signal or the borrow signal.

In Step 504, when before adjustment the current adjustment group has reached the maximum limit or the minimum limit and cannot be adjusted, the weight update unit 12 firstly sets the current adjustment group to the opposite of the maximum limit or the minimum limit (e.g., the weight update unit 12 sets the current adjustment group to the minimum limit when it has reached the maximum limit; the weight update unit 12 sets the current adjustment group to the maximum limit when it has reached the minimum limit), then sets the next group on the left as the current adjustment group, and transmits the carry signal or the borrow signal to the next group that has been set to the current adjustment group, wherein the next group is closer to the most significant group.

In Step 505, when the current adjustment group before adjustment has not reached the maximum limit or the minimum limit and can be adjusted, the weight update unit 12 adjusts the current adjustment group according to the carry signal or the borrow signal and completes this neural network weight adjustment.

In Step 506-507, when the weight update unit 12 determines that the current adjustment group is the most significant group G7 of the mantissa group and the most significant group before adjustment has reached the maximum limit or the minimum limit and cannot be adjusted, the weight update unit 12 increases the exponent group G_EXP and move all the mantissa groups to the right by at least one digit.

In Step 508, when the weight update unit 12 determines that the current adjustment group is the most significant group G7 of the mantissa group and the most significant group before adjustment has not reached the maximum limit or the minimum limit and can be adjusted, the weight update unit 12 adjusts the most significant group G7 according to the carry signal or the borrow signal.

In Step 509, the weight update unit 12 determines whether the most significant group G7 is zero after adjustment to determine whether to shift the mantissa groups with non-zero values to the left by one group to enhance the precision of the mantissa digits. In Step 510, when the weight update unit 12 determines that the most significant group G7 is zero after adjustment, the weight update unit 12 decreases the exponent group G_EXP, shifts all the mantissa groups toward the most significant digit by one group (e.g., shift the groups G6-G0 to the groups G7-G1, respectively), and sets the least significant group G0 to zero, and completes this neural network weight adjustment. When the weight update unit 12 determines that the most significant group G7 is not zero after adjustment, then this completes the neural network weight adjustment operation.

Figure 6:
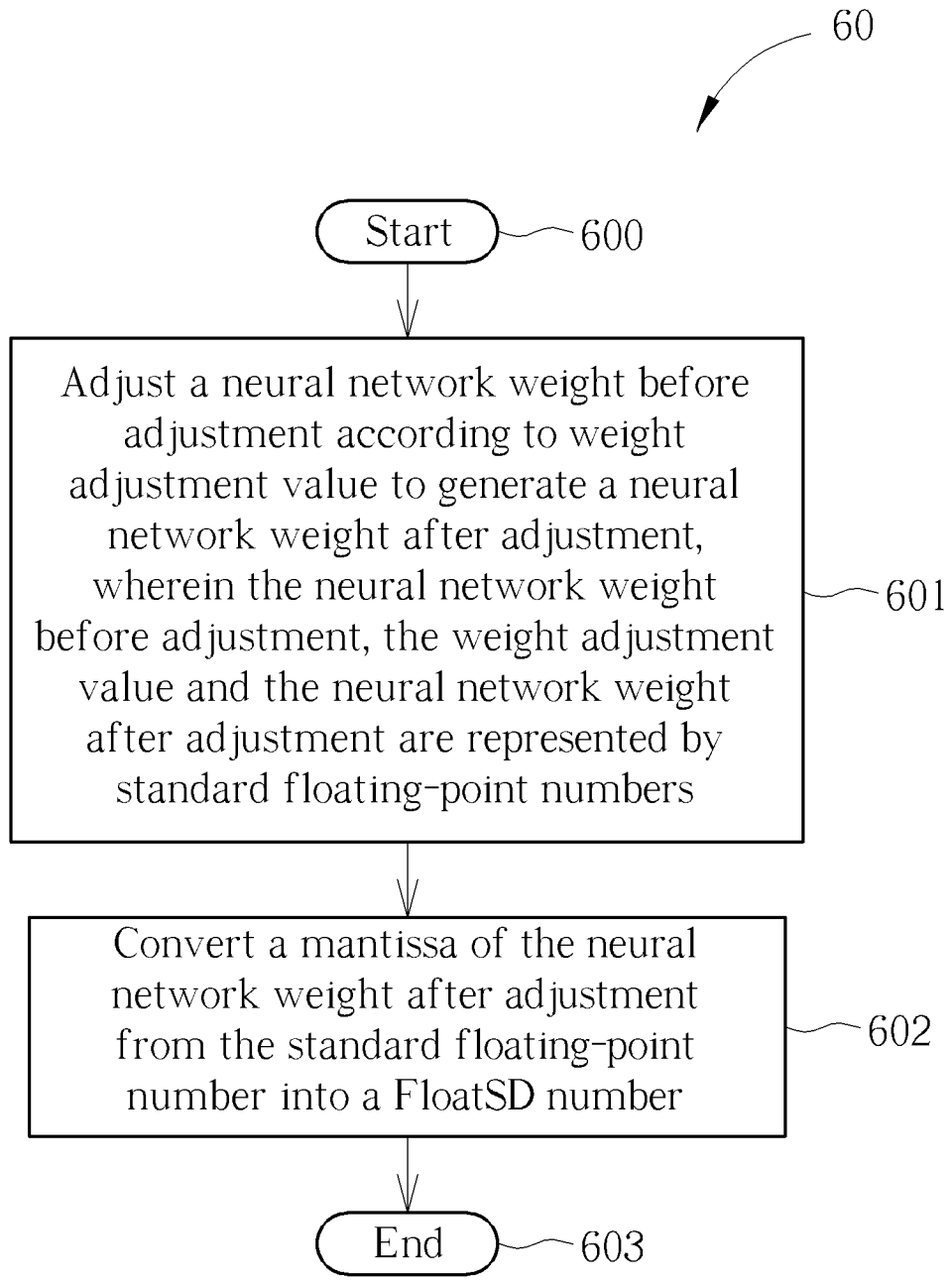
FIG. 6 is a flowchart of a weight adjustment process according to an embodiment of the present invention.

Operations regarding the weight update unit 12 to perform neural network weight adjustment may be summarized into a weight adjustment process 60 as shown in FIG. 6. The weight adjustment process 60 may be compiled into a program code and stored in a memory device, and configured to instruct the weight update unit 12 to perform the following steps.

Step 600: Start.

Step 601: Adjust a neural network weight before adjustment according to weight adjustment value to generate a neural network weight after adjustment, wherein the neural network weight before adjustment, the weight adjustment value and the neural network weight after adjustment are represented by standard floating-point numbers.

Step 602: Convert a mantissa of the neural network weight after adjustment from the standard floating-point number into a FloatSD number.

Step 603: End.

In the process 60, when adjusting the neural network weight, the weight update unit 12 may adjust the neural network weight before adjustment $W_{BEFORE}$ according to the weight adjustment value to generate the neural network weight after adjustment $W_{AFTER}$, wherein the neural network weight before adjustment $W_{BEFORE}$, the weight adjustment value and the neural network weight after adjustment $W_{AFTER}$ are represented by standard floating-point numbers (Step 601); then, the weight update unit 12 converts the mantissa of the neural network weight after adjustment $W_{AFTER}$ from the standard floating-point number into the FloatSD number for the neural network to carry out following weight adjustment value calculation and inference operation (Step 602). Therefore, by the process 60, the exact value of the mantissa of the neural network weight (represented by standard floating-point number) may be used to perform weight update and non-zero digits in mantissa of the neural network weight (represented by FloatSD numbers) may be reduced effectively, so as to achieve both precision of weight adjustment and low computation complexity in neural network inference and training.

To simplify neural network training and inference computation, the present invention uses floating-point signed digit (FloatSD) numbers to represent neural network weight values, and uses neural network weights and neuron output values to compute weight adjustment values during neural network training and neural network inference computation. As a result, the present invention can reduce the number of non-zero digits comprised in the neural network weights, which allows a few shift and add circuits to replace the multiplier circuit in performing multiplications involving the neural network weights, so as to reduce the computation complexity for network training (for example, forward pass computation and backward pass computation). In addition, since the neural network has the characteristics of error tolerance, the present invention uses two mantissa groups along with the exponent group, which reduces the number of non-zero digits of the neural network weights, to perform neural network inference computation, forward pass computation and backward pass computation. As a result, the computation complexity for multiplications between the neuron activation and the neural network weight can be simplified, so as to reduce the computation complexity, memory access, as well as hardware power consumption of neural network training and inference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of training a neural network, for a neural network, comprising:
    using a floating-point signed digit number to represent a neural network weight of the neural network, wherein a mantissa of the neural network weight is represented by multiple mantissa signed digit groups, and an exponent of the neural network weight is represented by an exponent digit group;
    using the exponent digit group and at least one of the multiple mantissa signed digit groups of the neural network weight to perform weight adjustment computation and neural network inference computation;
    using the exponent digit group and the at least one of the multiple mantissa signed digit groups of the neural network weight in the neural network to compute a weight adjustment value of the neural network weight;
    adjusting the neural network weight according to the weight adjustment value to generate a neural network weight after adjustment, wherein the weight adjustment value is represented by a standard floating-point number, the neural network weight, and the neural network weight after adjustment are represented by the floating-point signed digit numbers; and
    converting the weight adjustment value from the standard floating-point number into the floating-point signed digit number, wherein the weight adjustment value indicates at least one group, and each of the at least one group corresponds to at least one carry signal or at least one borrow signal, the neural network weight is first adjusted in the mantissa of the neural network weight followed by adjustment of the exponent of the neural network weight, and the adjustment of the mantissa part proceeds orderly from a current adjustment group in the multiple mantissa signed digit groups toward a most significant group of the multiple mantissa signed digit groups,
    wherein said adjusting the neural network weight according to the weight adjustment value comprises:
        determining the current adjustment group of the neural network weight according to the weight adjustment value;
        generating at least one carry signal or one borrow signal according to the weight adjustment value and transmitting the at least one carry signal or one borrow signal to the current adjustment group;
        when the current adjustment group is determined not the most significant group of the multiple mantissa signed digit groups, determining whether the current adjustment group has reached a maximum limit or a minimum limit and cannot be adjusted according to the carry signal or the borrow signal; and
        when the current adjustment group is determined the most significant group of the multiple mantissa signed digit groups, determining whether the most significant group has reached the maximum limit or the minimum limit and cannot be adjusted according to the carry signal or the borrow signal, and
    wherein the current adjustment group is determined the most significant group of the multiple mantissa signed digit groups, determining whether the most significant group has reached the maximum limit or the minimum limit and cannot be adjusted according to the carry signal or the borrow signal comprises:

when determined the current adjustment group has reached the maximum limit or the minimum limit and cannot be adjusted, increasing the exponent digit group and moving all the mantissa signed digit groups toward right by at least one digit;

adjusting the most significant group according to the carry signal or the borrow signal; and determining whether after adjustment the most significant group is zero to determine whether to adjust the multiple mantissa signed digit groups, said determining whether after adjustment the most significant group is zero to determine whether to adjust the multiple mantissa signed digit groups comprising:

when determined after adjustment the most significant group is zero, decreasing the exponent digit group; moving the multiple mantissa signed digit groups other than the most significant group toward the most significant group by one group; and setting the least significant group of the multiple mantissa signed digit groups to zero; and when determined after adjustment the most significant group is not zero, not adjusting the multiple mantissa signed digit groups.

2. The method of claim 1, wherein the neural network weight before adjustment, the weight adjustment value, and the neural network weight after adjustment are represented by standard floating-point numbers, further comprising:

converting the mantissa of the neural network weight after adjustment from the standard floating-point number into the floating-point signed digit number, to generate the neural network weight represented by the floating-point signed digit number.

3. The method of claim 1, wherein when the current adjustment group is determined not the most significant group of the multiple mantissa signed digit groups, determining whether before adjustment the current adjustment group has reached the maximum limit or the minimum limit and cannot be adjusted according to the carry signal or the borrow signal comprises:

when determined before adjustment the current adjustment group has reached the maximum limit or the minimum limit and cannot be adjusted, setting the current adjustment group to an opposite limit (the minimum limit or the maximum limit); setting a next group on the left as the current adjustment group; and transmitting the carry signal or the borrow signal to the new current adjustment group, wherein the next group on the left is closer to the most significant group than the current adjustment group; and when determined before adjustment the current adjustment group has not reached the maximum limit or the minimum limit and can be adjusted, adjusting the current adjustment group according to the carry signal or the borrow signal.

4. The method of claim 1, wherein the weight adjustment value is generated by a computation involving the exponent digit group and the at least one of the multiple mantissa signed digit groups of the neural network weight and a neuron output value of the neural network, wherein the neuron output value is represented by a fixed-point number or a floating-point number.

\* \* \* \* \*